United States Patent [19]

Baer

[11] 4,106,339
[45] Aug. 15, 1978

[54] WIND CHILL METER AND METHOD OF MEASURING WIND CHILL EFFECT

[76] Inventor: John Stephen Baer, Schooner Head, Bar Harbor, Me. 04609

[21] Appl. No.: 837,103

[22] Filed: Sep. 28, 1977

[51] Int. Cl.² .......................................... G01K 13/00
[52] U.S. Cl. .............................. 73/339 C; 73/170 R; 73/204; 73/344
[58] Field of Search ................. 73/339 C, 339 R, 204, 73/170 R, 189, 344, 362.5

[56] References Cited

U.S. PATENT DOCUMENTS

| | | | |
|---|---|---|---|
| 2,197,564 | 4/1940 | Yaglou | 73/339 C |
| 3,085,431 | 4/1963 | Yerman | 73/204 |
| 3,246,515 | 4/1966 | Martino | 73/204 |
| 3,304,778 | 2/1967 | Stuart | 73/189 |
| 3,954,007 | 5/1976 | Harrigan | 73/339 C |
| 3,995,481 | 12/1976 | Djorup | 73/189 |

FOREIGN PATENT DOCUMENTS 49,956  9/1939  France ................................ 73/339 C Primary Examiner—S. Clement Swisher
Assistant Examiner—Denis E. Corr
Attorney, Agent, or Firm—John C. Dorfman

[57] ABSTRACT

A first thermometer is conventionally calibrated and a second is calibrated to read a predetermined temperature lower than actual temperature and provided with a heater resistor in good heat transfer relation to its bulb. Switch means connects a battery to the resistor to heat the second thermometer until it is observed to read the same as the first. Then the switch is repositioned such that appropriate circuitry causes reduced heating such that the elevated temperature condition of the second thermometer is merely "held" at that position and the bulb of the second thermometer is exposed to the wind and after a predetermined time (on the order of 30 seconds) the second thermometer is read, its reading representing the effective temperature as the result of wind chill.

14 Claims, 3 Drawing Figures

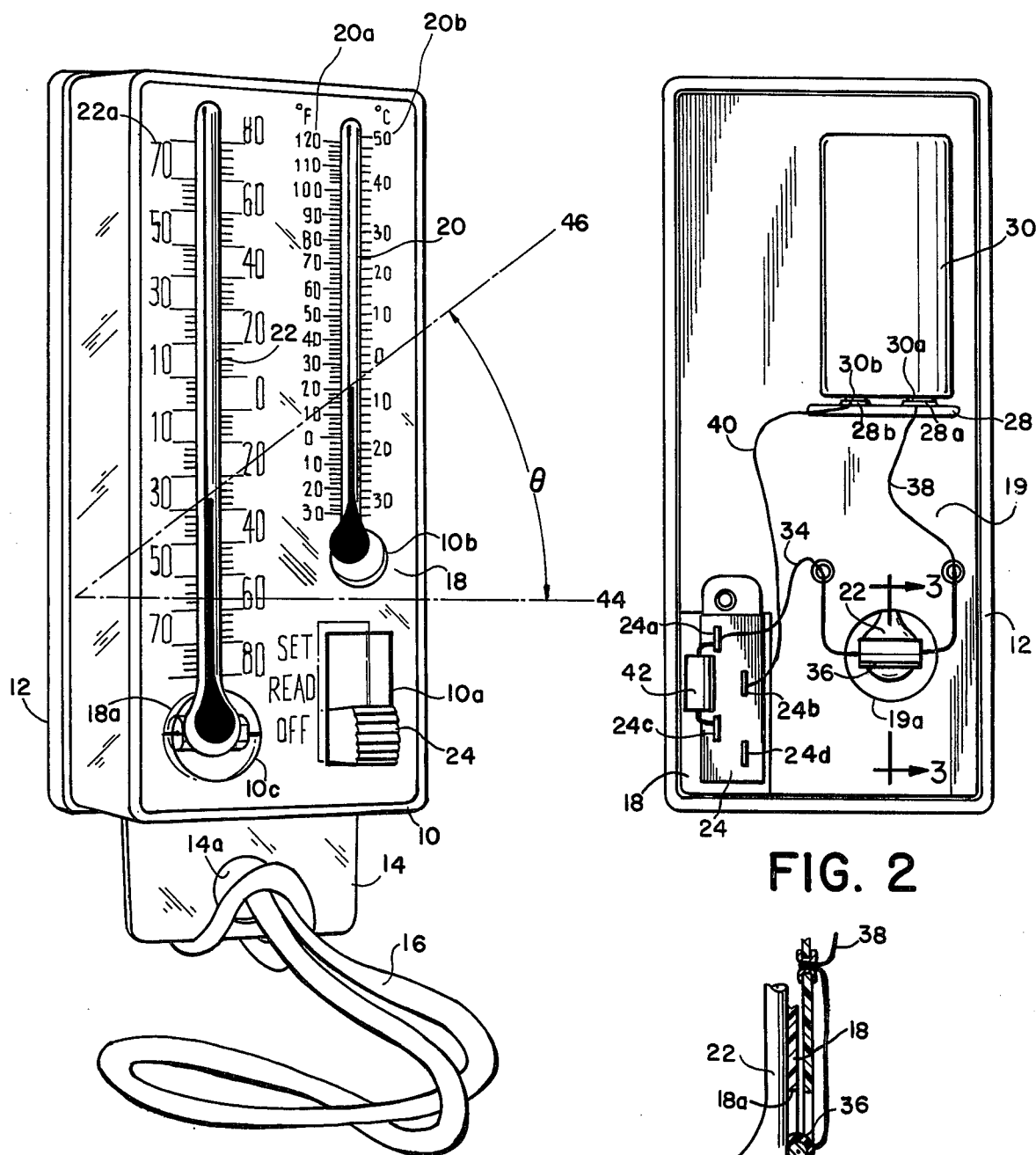
FIG. 1
FIG. 2
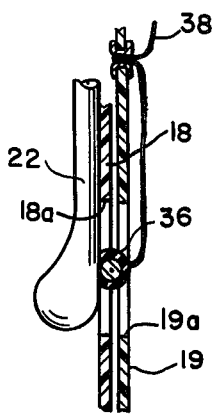
FIG. 3

WIND CHILL METER AND METHOD OF MEASURING WIND CHILL EFFECT

The present invention relates to a meter or measuring device which will directly record wind chill effect or more precisely, the present apparent temperature due to the cooling effect of the wind.

Numerous charts and tables have been developed to show the effect which a blowing wind has upon the apparent, as opposed to actual, temperature. Wind chill effect is included in the winter temperature forecasts by weather bureaus. Thermometers and other temperature measuring devices are not affected by the wind to the same extent that people are, and, when one reads a thermometer on a windy day, he is likely to feel that it is much colder than the thermometer indicates. For people who must work outdoors or sportsmen who are out in the weather, it becomes important to know the wind chill effective temperature to be able to avoid frostbite. However, very little instrumentation has been developed which is capable of indicating wind chill effective temperature.

The present invention is directed to a simple and inexpensive device, which may be calibrated to read out effective wind chill temperature directly upon following certain simple instructions. More specifically, the present device preferably uses two spirit thermometers, a first one of which is calibrated conventionally, and the second one of which is calibrated so that it reads a lower temperature than the other. To the bulb of this second thermometer is cemented, or otherwise arranged so that it has good thermal contact, a heater element. The heater element is provided with a power source or other means of heating it upon demand such that when energized the heater causes the second thermometer to rise. When it reaches the temperature indication corresponding to that of the first thermometer, a lower rate of heating is applied equivalent to what is needed to simply hold the temperature without any wind effect. Means selectively shielding the bulb of the second thermometer while heating its bulb is provided. When the selective shielding is removed from the second thermometer, and the bulb of the second thermometer is exposed to the wind for a predetermined time, the second thermometer will drop in temperature and after a predetermined time the effective wind chill temperature can be read directly from the calibrations of the second thermometer.

Not only is this meter simple and cheap to construct, it is easy to use and permits direct visual reading of actual and effective wind chill temperatures at the same time.

Within limits, the differences in these two temperatures is proportional to wind velocity. Therefore, if means is provided to measure the angle of a line through the two thermometer levels from the horizontal, and that means is calibrated to show different angles in terms of wind velocity a simple wind velocity meter is also provided.

More specifically, in accordance with the present invention there are provided first and second temperature measuring means, the first being conventionally calibrated and the second being calibrated in the same scale as the first but with that scale calibrated so that the normal reading is low by an amount representative of a predetermined wind chill effect. Heater means is associated with the second temperature measuring means and has appropriate energizing means so that upon energizing the heater means the indication of the second temperature measuring means can be made to correspond to that of the first temperature measuring means. The second temperature measuring means is selectively accessible to wind to effectively cool said second temperature measuring means.

The method of the present invention uses a pair of temperature measuring means, the first being conventionally calibrated and the second being calibrated to temperature lower than the first. The second temperature measuring means while shielded from the wind is heated to the temperature where its calibration corresponds to the ambient shown in the first, at which point heating is reduced to a holding power. The second temperature measuring means is then exposed to the wind for a predetermined time. Then the second temperature measuring means is directly observed and the wind chill effect temperature is read directly from its calibrations.

For a better understanding of the present invention references is made to the accompanying drawings, in which:

FIG. 1 is a front perspective view of a preferred embodiment of the wind chill meter of the present invention;

FIG. 2 is a rear view of the meter of FIG. 1 through a transparent back cover or with that cover removed; and FIG. 3 is a partial sectional view taken on line 3—3 of FIG. 2.

A wind chill meter of the present invention is shown in a perspective view from the front showing the enclosing molded resinous enclosure 10 of generally rectangular form, which is preferably transparent so that the internal indicators can be seen. The enclosure 10 is a shallow box having a back lid closure 12. The enclosure is preferably provided with a flange 14 provided with a hole 14a through which extends a suitable cord 16, the length of the cord determining whether it is suitable for placing about the wrist of the wearer as in the embodiment shown, or alternatively, for hanging the device around the wearer's neck. This cord permits necessary handling without worry about dropping the meter into the snow, for example. A longer cord permits the wearer to keep the meter tucked inside his jacket or coat when not in use, a recommended procedure. Within the casting is a thermometer mounting deck 18 which is backed with a chassis 19 for electrical elements. This mounting deck 18 may be formed of insulation material or sheetmetal. The chassis 19 is preferably formed of a plastic insulating material, such as a phenolic. Both deck 18 and chassis 19 are of a size to fit snugly within casing 10. On the outside face of the mounting deck 18 are mounted a pair of spirit thermometers 20 and 22 in a conventional manner for supporting thermometers on a plastic or sheetmetal base. The smaller thermometer 20 has conventional temperature calibrations. Fahrenheit calibrations 20a are shown to the left and Celsius calibrations 20b to the right of thermometer 20. In this embodiment only enlarged Fahrenheit calibrations 22a are shown for thermometer 22 as it is viewed through the transparent case 10 for ease in reading. It will be understood it may also include, or instead employ, only Celsius calibrations, for example. In this particular embodiment, thermometer 22 is larger than thermometer 20 also to aid in its reading.

Supported on the bottom of chassis 19 and projecting above deck 18 is a three-position switch 24. Switch 24 is advantageously a slide switch whose slide is positionable by finger pressure to one of three positions as labeled and accessible through a slot 10a in the cover 10 which is of sufficient size to permit movement of the switch slide actuator. Holes 10b and 10c are provided in enclosure 10 opposite the bulbs of thermometers 20 and 22, respectively, to permit free atmospheric access to the thermometer bulbs. Hole 10c is aligned with a hole 18a in the mounting deck and 19a in the chassis which, in turn, are aligned with a hole 12a (seen in FIG. 2) through the back panel 12, thus permitting wind passage through the housing through the respective aligned hole when the enclosure is turned to face into the wind. Holes 10c and 12a can be closed by fingers of the lefthand when manipulating the switch with the right, for example.

Referring now to FIGS. 2 and 3, the back cover 12 for the enclosure is shown to be transparent although in a given application it may be opaque or backed with opaque material including operating instruction. The sidewalls of the enclosure 10 support the cover 12 in any appropriate way, as by friction fit, or hinge and latch construction. Assuming that the back cover 12 is transparent, it is possible to see the bottom of the chassis 19 which supports the switch. Conventional battery clip 28 snaps onto the battery 30 (advantageously a conventional 9-volt dry cell) whose terminals 30a and 30b are designed to be engaged and held engaging terminal 28a and 28b on insulating support bracket 28 so that these terminals are mutually insulated from one another.

The resistors seen in FIG. 2 are selectively connected into a circuit with the battery 30 by a switch 24. The switch 24 is provided with terminals 24a, 24b, 24c, and 24d which correspond to switch contacts. Terminal 24a is connected by a conductive lead 34 to a heater resistor 36 which is cemented to the bulb of thermometer 22 in a manner which will be described. The other end of resistor 36 is connected by a conductive lead 38 to terminal 28a and thence terminal 30a of battery 30. Finally, terminal 30b of the battery is connected back through conductive lead 40 to terminal 24b. When the switch 24 has its slide actuator positioned to the "set" position shown in FIG. 1, the terminals 24a and 24b are connected together which, in effect, connects the resistor 36 directly across the terminals of battery 30. As seen in FIG. 2 the resistor 36 is preferably a carbon resistor which has one face flattened so that the carbon core is in contact or near contact to the bulb of thermometer 22 to which it is cemented by epoxy cement or other means to assure good thermal contact between the heater resistor and the bulb. The heater resistor in this condition causes rapid heating of the thermometer causing the indicating temperature to rise very rapidly and in the method which will be described the observer compares the temperatures shown on the calibration on the two thermometers until they are equal. When they are equal, the switch 24 is set to an intermediate position which is marked "read" or "hold". In this position the terminals 24b and 24c are connected together. Since resistor 42 is connected across terminals 24c and 24a in this position, resistor 42 is placed in series with resistor 36 but in all other respects the circuit is the same. The increased resistance causes a reduction of current flow and, therefore, a decrease in the heating effect. The resistors are selected such that the heating effect produced on the thermometer 22 by heater resistor 36 in this circuit configuration is just sufficient to maintain the elevated temperature and not sufficient to cause its increase. When the switch 24 is positioned in the "off" position shown in FIG. 1 the terminals 24c and 24d are connected together but since 24d has no connection there is no circuit completed. In preferred embodiments the switch 24 has spring biasing means to urge the actuator out of the super-heating "set" position and into the "read" position in order to protect the thermometer and the meter as a whole from the damage due to overheating.

In the use of the device, the following method is preferred. The switch 24 is moved from "off" position to "set" position so that the heater 36 causes the level of the thermometer 22 to rise. The observer reads the thermometers 20 and 22 and when their calibrated readings are the same, he repositions the switch 24 to the intermediate "read" position. In this position, the temperature reading of thermometer 22 is maintained over a short period of time, during which it does not increase or decrease so long as the thermometer is not exposed to the wind. To prevent unintentional exposure the holes 10c in the enclosure 10 and 12a in the back cover 12 may be covered by placing the thumb and a finger such as the third finger over these holes while making observations, thus, shielding the heater and the thermometer bulb. When the reading is to be made after the switch has been set in the "read" position, the thumb and finger are removed allowing the heater and thermometer bulb to be exposed and the holes 10c, 18a, and 12a are aligned in the direction of the wind. They are held in this position a predetermined time, for example, 30 seconds in a preferred embodiment, and then the level of the thermometer 22 is read against its calibrations which represent the effective wind chill temperature.

It will be appreciated that there are numbers of variables involved and that small variations can make considerable differences in the results. The calibration of thermometer 22, for example, may vary somewhat but in a specific embodiment it was made such that it read 40° below the actual temperature registered by thermometer 20 under still and unheated conditions. The sizes of the resistors employed may vary considerably and heaters, other than carbon resistors, or any other type of suitable resistors, can be used. The requirement, however, is that there be good heat transfer, and preferably conduction, between the heater element corresponding to heater resistor 36 and the bulb of thermometer 22. The requirement of resistor 42 is somewhat different because its primary use is not to directly heat something but rather as a current reducing means. This function need not be performed in exactly the circuit configuration shown, but whatever the current limiting function of the resistor or resistors employed or other devices used, the design criterion is that the heat produced be just sufficient to hold the selected temperature reasonably steady for a period of at least a minute or two under shielded conditions. In the embodiment shown both resistors 36 and 42 are carbon resistors of 100-ohm ½ watt size and the battery is a conventional 9-volt dry cell. Finally, the time selected for cooling may vary somewhat but in the described configuration where aligned holes were sufficiently small to permit closing by fingertips is preferably on the order of 30 seconds. A device built with these parameters has proved effective to provide a good measurement of effective wind chill temperature.

It will be understood that the temperature indicating device can be changed considerably. While spirit thermometers are preferred, in other applications other types of thermometers, and other sizes, and calibrations in different scales are possible. Even use of entirely different types of temperature indicating devices is possible. One advantage of the use of thermometers, however, is that a line drawn to an arbitrary horizontal 44 through the levels in the two thermometers along the line of sight 46 provides an angle θ which is proportional to wind velocity when the wind chill effective temperature has been achieved. It is possible to provide slides and calibrations which can be lined up to give a direct reading not only of the angle but of the wind velocity represented by the angle in a particular piece of equipment. It is also possible to provide a chart which shows temperature comparison levels and the representative wind velocity of which they are indicative.

For a better understanding of the present invention reference is made to the appended claims. These claims are intended to apply to all variations and modifications of structure which these terms may include. It is also specifically provided that a single thermometer device may be used as a wind chill meter for comparison against another thermometer but such an arrangement is not prefered in view of the inconvenience of having to find the thermometer corresponding to thermometer 20 in the present apparatus.

I claim:

1. A wind chill meter comprising in combination
   first and second temperature measuring means, the first being conventionally calibrated and the second being calibrated in the same temperature scale as the first but with that scale offset so that the normal reading is low by an amount representative of a preselected chill effect,
   heater means associated with the second temperature measuring means, having appropriate energizing means,
   means for selectively energizing said heater means so that at one selection position, upon energizing the heater means, the indication of the second temperature measuring means can be made to rise to the level calibrated to correspond to the temperature shown on the first temperature measuring means and in a second selection position that level can be maintained in the absence of wind, and
   wind shield means for selectively shielding at least heater means associated with the second temperature measuring means or permitting the wind to cool said heater means associated with said second temperature measuring means.

2. The wind chill meter of claim 1 in which the temperature measuring means are thermometers and the heater means is in good heat exchange relationship with the bulb of the second thermometer.

3. The wind chill meter of claim 2 in which the heater is bonded to the bulb of the second thermometer.

4. The wind chill meter of claim 3 in which the heater is a carbon resistor having a flattened face bonded to a flattened face of a thermometer bulb.

5. The wind chill meter of claim 2 in which a small battery connector is provided to receive a battery as a power source for the heater and the means for selectively connecting the heater to the power source includes a switch and other circuit elements permitting two levels of heating, at one of which selected temperature is maintained in the absence of wind.

6. The wind chill meter of claim 3 in which a resistor of selected size to reduce energy to a level to hold a selected temperature is combined in a circuit with a switch which allows full power to the heater or power reduced by said resistor to the heater.

7. The wind chill meter of claim 6 in which the switch actuator includes a spring elememt which biases the actuator of the switch into its reduced power position so that when finger pressure is removed the actuator will assume the reduced power position to reduce the danger of overheating.

8. The wind chill meter of claim 4 in which a resistor similar to the one used for the heater may be selectively connected in a series or out of the circuit by a switch which also may cut all power off from the heater.

9. The wind chill meter of claim 3 in which a transparent box enclosure through which the thermometer can be observed is provided with aligned openings through the enclosure walls and through the support deck for the second thermometer at the bulb.

10. The wind chill meter of claim 3 in which the thermometers are mounted on a planar deck which together with a switch and heater supporting chassis are snugly accepted within a box enclosure serving as a wind shield, a three position switch is supported by the chassis and electrically connected to a battery holder and circuitry to the heater.

11. The wind chill meter of claim 10 in which said enclosure is a transparent box within which the chassis is snugly secured and through which the thermometer can be observed and having aligned openings in the enclosure and the chassis at the bulb of the second thermometer.

12. A wind chill meter comprising in combination
    temperature measuring means with a conventional scale offset below normal by an amount representative of a preselected chill effect,
    heater means associated with the temperature measuring means,
    means for selectively energizing the heater means so that at one selection upon energizing the heater means the indication of the temperature measuring means can be made to rise to the level calibrated to correspond to the temperature observed on a separate conventionally calibrated temperature measuring means, and in a second selection position that level can be maintained in the absence of wind, and
    wind shield means for selectively shielding at least the heater means associated with the temperature measuring means or permitting the wind to cool said heater means associated with temperature measuring means.

13. The method of measuring wind chill using a pair of temperature measuring means, the first being conventionally calibrated and the second being calibrated to temperature lower than the first by the amount required by the maximum amount of cooling encountered,
    heating the second temperature measuring means rapidly to a temperature where its calibration corresponds to the ambient shown in the first, at which point temperature rise is terminated,
    continuing heating of the second temperature measuring means at a lower rate sufficiently that its temperature measurement will be maintained at the selected reading corresponding to ambient in the absence of wind,
    exposing the second temperature measuring means to wind while maintaining reduced heating in order to reduce the net heating effect to the second temperature measuring means, and observing the wind chill effect temperature directly from the calibrations on the second temperature measuring means after its temperature has fallen due to the wind.

14. The method of claim 13 in which the second temperature measuring means is shielded from the wind at least while its temperature is raised to the ambient level and until the second temperature measuring means is exposed to the wind.

* * * * *